March 22, 1932.　　R. PEOPLES　　1,850,849
MIXER CONTROLLING DEVICE
Filed May 14, 1928　　3 Sheets-Sheet 1
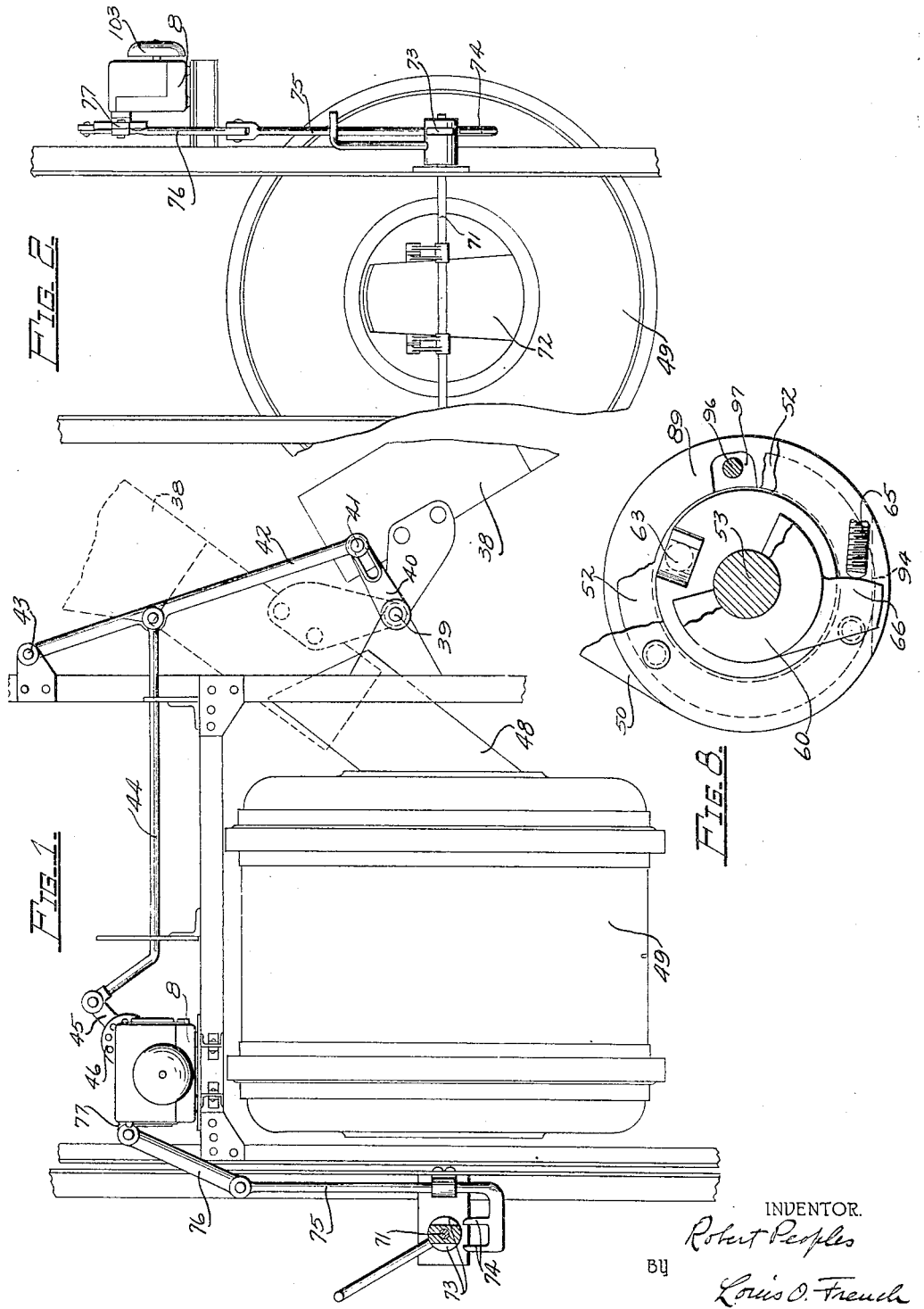
INVENTOR.
Robert Peoples
BY
Louis O. French
ATTORNEY

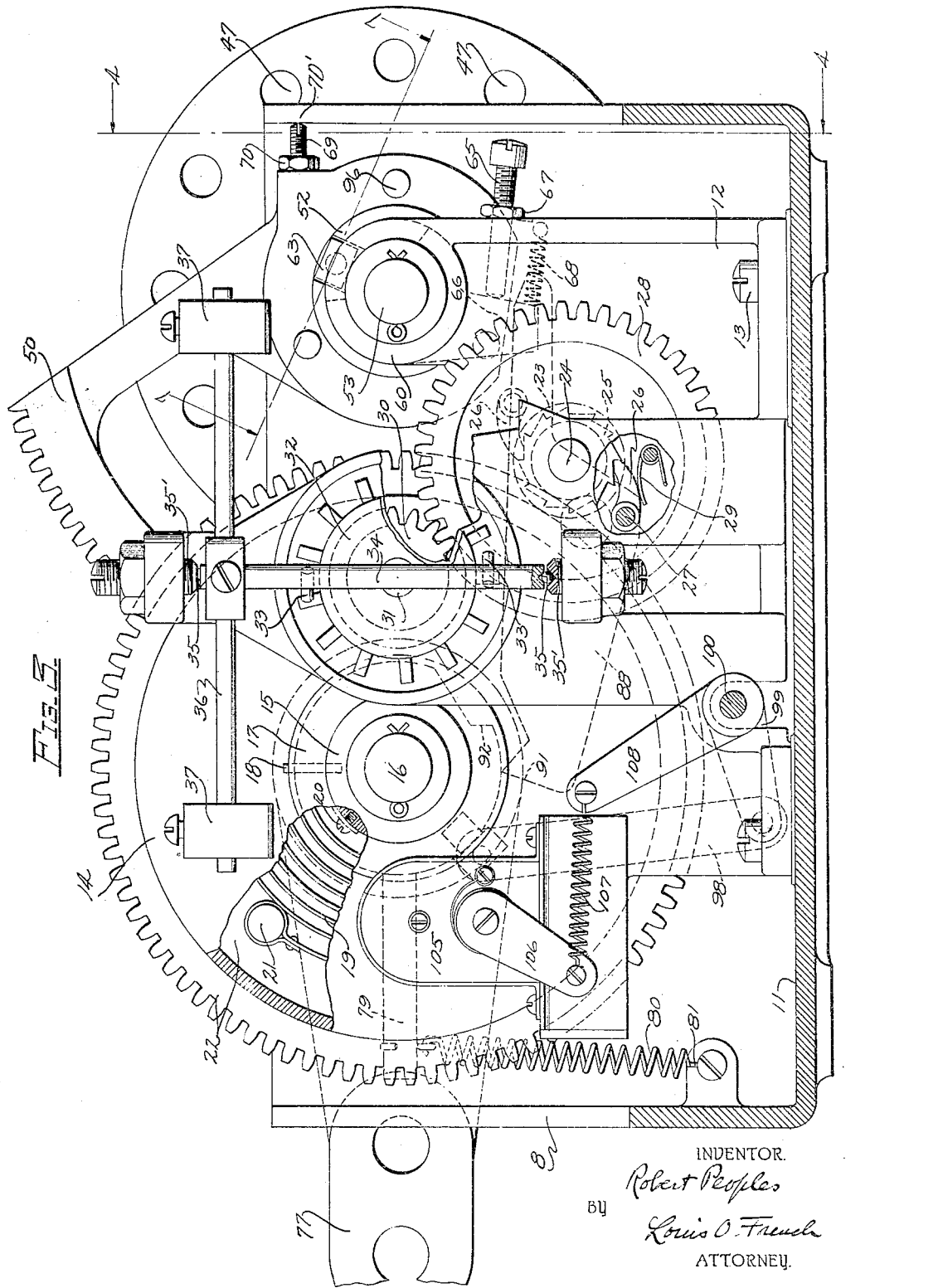

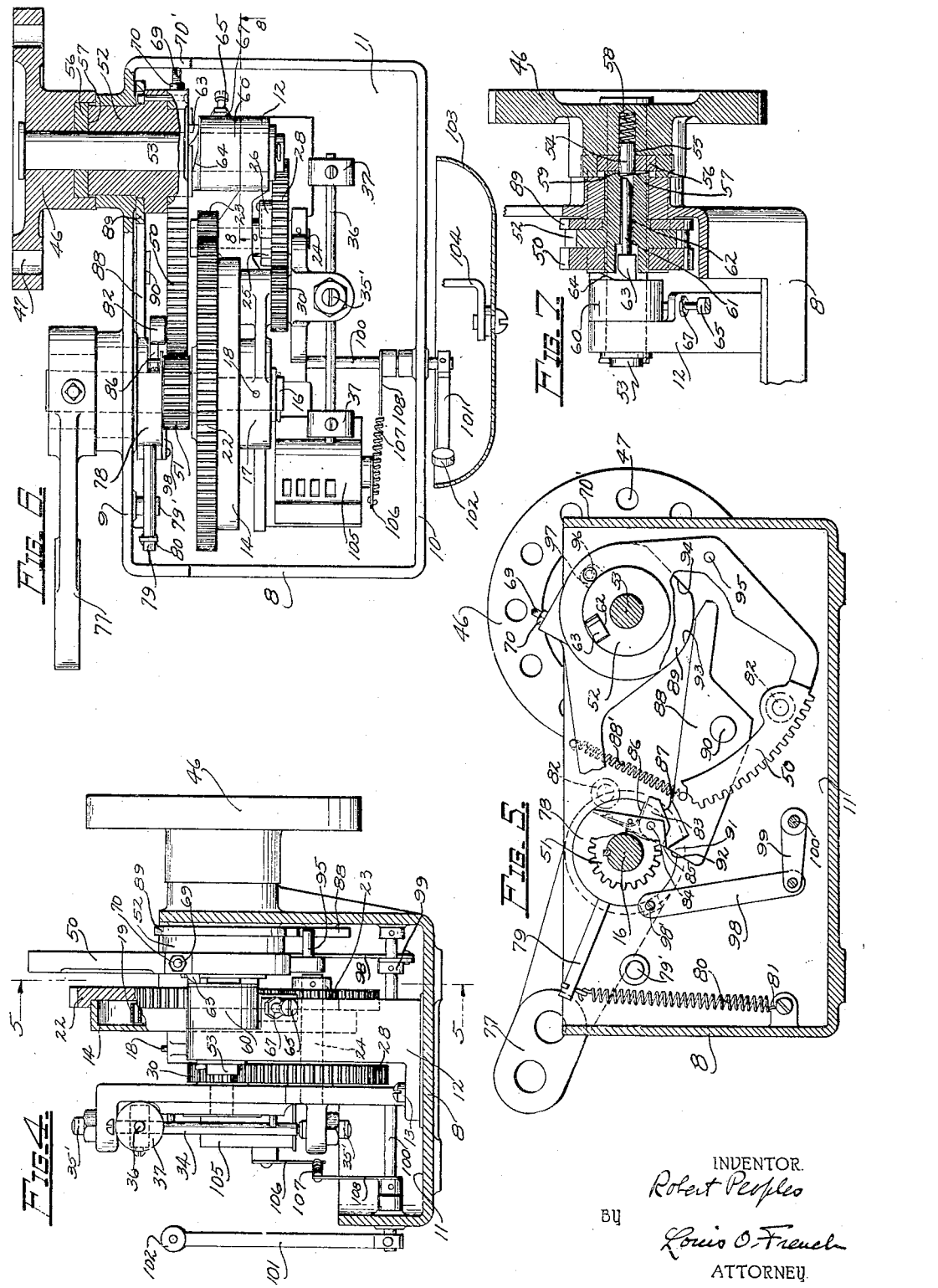

Patented Mar. 22, 1932

1,850,849

UNITED STATES PATENT OFFICE

ROBERT PEOPLES, OF MILWAUKEE, WISCONSIN, ASSIGNOR TO DURANT MANUFACTURING COMPANY, OF MILWAUKEE, WISCONSIN, A CORPORATION OF WISCONSIN

MIXER CONTROLLING DEVICE

Application filed May 14, 1928. Serial No. 277,513.

The invention relates to mixer controlling devices and more particularly to devices now generally known as batch-meters.

Batch-meters, while applicable generally to different kinds of mixing machines, have become especially useful for machines for mixing concrete, as they compel the operator to run the machine for a sufficient length of time or number of operations of the mixer, after the aggregates have been introduced therein, to insure the proper mixing of said aggregates before they can be discharged from the mixer. Such machines generally include automatic signalling mechanism, counting and mixer discharge controlling means, and the object of this invention is to provide a simple, compact and efficient apparatus for accomplishing this purpose and more particularly where the timing mechanism is driven by a spring motor.

The invention further consists in the several features hereinafter set forth and more particularly defined by claims at the conclusion hereof.

In the drawings Fig. 1 is a side elevation view of a mixing machine, showing the control device applied thereto;

Fig. 2 is a detail front end view of a mixing machine with the control device applied thereto;

Fig. 3 is a front elevation view of control apparatus embodying the invention, parts being broken away and parts being shown in section, with one of the cover sections removed;

Fig. 4 is a detail sectional view taken on the line 4—4 of Fig. 3, parts being broken away;

Fig. 5 is a detail sectional view taken on the line 5—5 of Fig. 4;

Fig. 6 is a detail plan view of the apparatus with one of the cover sections removed and the gong shown in section;

Fig. 7 is a detail sectional view taken on the line 7—7 of Fig. 3;

Fig. 8 is a detail end view of parts of the mechanism, parts being broken away and parts being shown in section.

The device includes a sectional casing of which the main casing section 8 is shown having end walls 9 and 10 and a bottom 11 to which an upright casting or shaft-supporting frame 12 is secured by screws 13.

The spring motor mechanism includes an annular casing member 14 whose hub portion 15 forms a journal for the motor shaft 16 and projects into a boss 17 of the frame 12 to which it is firmly secured, as by a pin 18, and one end of the coiled power spring 19 is secured to said hub by a screw 20 while the other end of said spring is secured by a pin 21 to a drive gear 22. This gear 22 meshes with a gear 23 on an intermediate shaft 24 which carries a ratchet-wheel 25 engaged by pawls 26, each pivotally mounted on a pin 27, carried by a gear 28 loose on the shaft 24, and urged against said ratchet-wheel by a spring 29. The gear 28 meshes with a gear 30 on a shaft 31 carrying an escapement pin gear 32 whose pins are alternately engaged by transverse pins 33 on an upright shaft 34 journalled on ball bearings 35 carried in screws 35' mounted in the frame 12 and carrying a shaft 36 upon which the escapement weights 37 are adjustably mounted. Thus, when the spring is wound up by rotating the gear 22 relative to the casing 14, during which time the ratchet-wheel 25 is free to move past the pawls, the necessary energy is stored up in the spring 19 to actuate the control mechanism and this energy is then released under the governing action of the escapement mechanism which is driven through the gearing previously described.

The spring motor is arranged to be wound up by the operation of one of the moving parts of the mixer and preferably the loading skip 38 whose pivot shaft 39 is here shown as provided with a slotted arm 40 connected by a pin 41 to the free end of a lever 42 pivoted at 43 and connected intermediate its ends by a link 44 with an arm 45 which is adjustably secured by suitable bolts to the rewind disc 46 which has a plurality of diametrically spaced holes 47 for the reception of the clamping bolts for the arm 45, whereby, as the skip 38 moves to discharge its load into the chute 48 leading to the mixing drum 49 the link 44 will move to the left and swing the arm 45 and disc 46 which, through the mechanism hereinafter described, oscillates the segmental gear 50 that meshes with a gear 51 on the timing drive shaft 16.

The gear 50 is fixed on a sleeve 52 journalled in the wall 9 and free to rotate upon a shaft 53 supported at one end in frame 12 and upon which the disc 46 is also free to rotate. The disc 46 and sleeve are operatively connected together by a releasable clutch, including a clutch pin 54 slidably mounted in a bore 55 in said disk and a plate 56 associated therewith and urged against the clutch face 57 of said sleeve 52 by a spring 58, said pin being engageable with a shoulder 59 of said face so as to rotate said sleeve in a direction to wind up the spring motor but being free of said sleeve when rotating in a reverse direction.

The timing period is determined by the extent of winding up of the spring and this is controlled by a timing control member 60 which acts upon a timing latch pin 61. This pin is slidably mounted in an eccentrically disposed recess 62 formed in the sleeve 52 and is adapted, when the inclined surface of its head 63 engages the inclined face 64 of the control member 60, to be moved inwardly thereby and thus push the clutch pin 54 rearwardly out of engagement with the clutch face 57 when the spring motor has been wound up to the desired extent, it being noted that under these conditions the disc 46 is free to be rotated further by the action of the link 44 without interfering with the proper timing of the apparatus. The control member 60 is free to rotate or oscillate relative to its supporting shaft 53 and is settable to any desired timing position relative to the latch pin 61 by means of a screw 65 adjustably mounted in the frame 12 and engageable with a projection 66 of the control member 60 and secured in adjusted position by a locknut 67. While the reactions of the pin 61 on the control member 60 always act to hold the projection 66 against the screw 65, a spring 68, secured at one end to said projection and at its other end to said frame, may be used to insure this engagement. The hub of the gear 50 is provided with an adjustable stop in the form of a screw 69 held in adjusted position by a locknut 70 and adapted to engage the end wall 70' of the casing so as to positively limit the release position of said gear and when once adjusted is maintained in this position regardless of the adjustment of the control member 60. Thus, the release position being always the same, the swinging of the control member 60 in a clockwise direction, by the turning in of the screw 65, will reduce the extent of winding up of the spring motor and hence the timing period, while the turning out of the said screw will cause the control member to swing in the opposite direction and thus increase the timing period. In brief, the distance between the latch pin 61 and the cam face 64 of the control member determines the timing period and this is increased or diminished by the angular adjustment of the control member 60 under the action or control of the screw 65.

The discharge chute of the mixer may be locked against movement by any suitable locking mechanism associated with the control apparatus and for the purpose of illustration I have shown the shaft 71, which controls the operation of the discharge chute 72, as provided with a member having locking recesses 73 adapted to be engaged by the forked arms 74 of a locking member 75 connected by a link 76 with a locking release lever 77 fixed on a sleeve 78 loose on the shaft 16 and journalled in the rear wall 9 of the casing, the movement of lever 77 and sleeve 78 being under the control of the timing mechanism so that during the timing period said parts are held stationary in a position in which arms 74 engage the recesses 73 to prevent the shaft's rotation and after the timing period are moved to release position, permitting oscillation of shaft 71 and hence movement of the chute 72 to discharge position.

The mechanism for moving the lever 77 and sleeve 78 to a locked position, retaining said parts in such position during the timing period and then releasing the same, includes the parts more particularly shown in Fig. 5. Referring to this figure, the numeral 79 designates a pin projecting from the sleeve 78 and connected at its outer end to one end of a release spring 80 whose other end 81 is anchored to the casing, said spring acting to urge said sleeve 78 and lever 77 to a lock-release position. Energy is stored up in this spring for this purpose by means of a pin 82 projecting laterally from the gear 50 into the path of a detent 83 pivotally mounted in a recessed portion of the sleeve 78 upon a pin 84 and urged into abutting engagement with a stop surface 85 on said sleeve by a spring 86, said detent having an inclined face 87 permitting passage of said pin 82 past said detent while said gear 80 is turning in a clockwise direction during the timing period, the release position of said pin 82 being shown in dotted lines above the detent 83 but movable during the winding up of the spring motor into engagement therewith to swing the sleeve 78 and lever 77 to the "cocked" position shown in Fig. 5.

The parts 78 and 77 are retained in a "cocked" position by the interaction of a latch 88 and cam 89. The latch 88 is pivotally mounted on a pin 90 secured to the back wall of the casing and its front face 91 is urged by a spring 88' into engagement with a stop face 92 formed in the sleeve 78 and when so engaged is held against movement by the face 93 of the cam 89. The cam 89 also has a flat face 94 that permits an upward movement of the rear end of the latch at the end of the timing period when a pin 95 on the gear 50 engages said latch to swing said end upwardly and thus release its front face 92 from engagement with said sleeve 78 and this permits a rapid, downward movement of the lever 77 to a lock-release position under the action of the spring 80 and hence a release of the discharge chute locking mechanism. A stop pin 79' on the casing, engageable with the pin 79, limits the release position of sleeve 78 and lever 77. The cam 89 loose on shaft 53 is mounted to move with the gear 50 by the engagement of a pin 96 carried by said gear with either end of a slot 97 in said cam. This slot provides a limited lost-motion connection between said cam and gear 50 so as to compensate for the relatively different rates of angular movement between said gear and shaft 16, thereby preventing any possibility of breaking the teeth of the gears 50 and 51 and also insuring the movement of the gear 50 to a position in which the pin 82 is free of the detent 83 in the release position of the parts.

To advise the operator of the completion of the mixing operation, a signal is operated at the time of the release of the discharge chute. As shown, the sleeve 78 is connected by a bolt 98' and a link 98 with a crank arm 99 secured to a shaft 100 journalled in the casing and extending outside the same and at its extended end carrying a striker arm, including a spring 101 and knocker 102 engageable with a gong 103 mounted on a suitable bracket 104 secured to the casing, whereby, when the release lever 77 moves to an unlocked position said striker arm is swung outwardly so that its knocker 102 strikes the gong a sharp blow and thus signals to the operator the completion of the mixing operation.

As a tally on the number of batches that have been mixed, a counter 105 of any suitable construction has its oscillatory operating arm 106 connected by a spring 107 with a crank arm 108 carried by the shaft 100.

The operation of the device, in brief, is as follows: Turning of the disc 46 during the charging of the mixer winds up the spring 19 through the downward swinging movement of gear 50 and clockwise rotation of gears 51, 22, this winding up action being automatically cut out when the clutch pin 54 is tripped by outward movement of pin 63 by the face 64 of the timing control member 60. During the first movement of the gear 50 and hence during the movement of the parts for any timing period within the range of adjustment of the member 60, the pin 82 engages detent 83 and swings the sleeve 78 to a "cocked" position with latch 88 engaged therewith, the actual travel of the gear 50 being greater so that the pin 82 passes said detent 83, as shown in Fig. 5. With the lever 77 in this position, the mixer is locked and the escapement governed spring then gradually releases its energy, thereby causing the gear 51 to rotate in a counter-clockwise direction and swing the segmental gear 50 upwardly until the pin 95, engaging latch 88 while flat face 94 faces said latch, trips said latch out of engagement with the sleeve 78 so that spring 80 may then act to release the discharge chute operating mechanism.

I desire it to be understood that this invention is not to be limited to any specific form or arrangement of parts except insofar as such limitations are specified in the claims.

What I claim as my invention is:

1. In a batchmeter, a control for a mixer discharge comprising tensioned lock release mechanism, a detent to hold said lock release mechanism in locked position, an oscillatory cam for maintaining said detent in locked position until the end of any mixing period, a spring motor timer, means for winding up said spring motor including a member driven by said motor during the desired mixing period and moving with said cam and provided with a part engageable with said detent to release the same from said lock release mechanism at the end of the mixing period.

2. In a batchmeter, a control for a mixer discharge comprising tensioned lock release mechanism, a detent for maintaining said lock release mechanism in locked position, an oscillatory cam for maintaining said detent in locked position until the end of any mixing period, a spring motor timer, means including an oscillatory member for winding up said timer and driven by said motor during the desired mixing period and moving with said cam and provided with a part engageable with said detent to release the same from said lock release mechanism at the end of the mixing period, and means providing a releasable operating connection between said lock release mechanism and said oscillatory member to move said mechanism to locked position during the winding up of said spring motor timer.

3. In a batchmeter, a control for a mixer discharge comprising tensioned lock release mechanism, a detent for maintaining said lock release mechanism in locked position, an oscillatory cam for maintaining said detent in locked position during any timing period, a spring motor timer, means including an oscillatory member for winding up said timer and driven by said motor during the desired mixing period and moving with said cam and provided with a part engageable with said detent to release the same from said lock release mechanism at the end of the mixing period, means providing a releasable operating connection between said lock release mechanism and said oscillatory member to move said mechanism to locked position during the winding up of said spring motor timer, driving means having a releasable clutch connection with said oscillatory member, and a rotatably settable member for releasing said clutch connection and determining the extent of winding up of said motor and hence the duration of the mixing period.

4. In a batchmeter, the combination of a lock release mechanism including an oscillatory member provided with a pivoted cocking pawl and a stop, spring means for tensioning said member, a spring motor timer, gearing for winding up the spring of said motor including a segmental gear, driving means for moving said gear and having a releasable clutch connection therewith, a settable member for releasing said clutch connection when the spring of said motor is wound up to a predetermined extent, a member on said gear engageable with said cocking pawl to move said oscillatory member to locked position, a spring-pressed detent engageable with said stop to hold said oscillatory member in locked position, a cam moving with said gear for maintaining said detent in locked position during any mixing period, and a member on said gear engageable with said detent to release the same at the end of the mixing period.

5. In a batchmeter, a control for a mixer discharge comprising tensioned lock release mechanism, a detent for maintaining said lock release mechanism in locked position, a cam for maintaining said detent in locked position during any mixing period, a spring motor timer, means including an oscillatory member for winding up said timer and driven by said motor during the desired mixing period, said cam connected to move with said oscillatory member with limited lost-motion relative thereto, said oscillatory member provided with a part engageable with said detent to release the same from said lock release mechanism at the end of the mixing period, and means providing a releasable operating connection between said lock release mechanism and said oscillatory member to move said mechanism to locked position during the winding up of said spring motor timer.

6. In a batchmeter, the combination with a spring motor, of means for winding up said spring motor including an oscillatory member and gearing connecting said member with the motor, said oscillatory member having a clutch face, a rotary actuating member provided with a spring-pressed pin normally engageable with said face, and means for releasing said pin after a predetermined movement of said oscillatory member by said rotary member including a rotatably adjustable member.

7. In a batchmeter, a control for a tensioned lock release mechanism of a mixer discharge comprising a detent for maintaining the lock release mechanism in locked position, a cam for maintaining said detent in locked position during any mixing period, timing means including an oscillatory member, said cam being connected to move with said oscillatory member with limited lost motion relative thereto, said oscillatory member provided with a part engageable with said detent to release the same from said lock release mechanism at the end of the mixing period.

8. In a batchmeter, a control for a tensioned lock release mechanism of a mixer discharge comprising a spring-pressed detent for holding the lock release mechanism in locked position, means for positively holding said detent against operation during any mixing period, timing means including an oscillatory member provided with a part engageable with said detent to release the same from said lock release mechanism at the end of the mixing period.

In testimony whereof, I affix my signature.

ROBERT PEOPLES.